United States Patent
Hu et al.

(10) Patent No.: US 12,441,904 B2
(45) Date of Patent: Oct. 14, 2025

(54) CURABLE CARBON NANOTUBE INK AND TRANSPARENT CONDUCTIVE FILMS CREATED USING THE INK

(71) Applicant: CHASM ADVANCED MATERIALS, INC, Canton, MA (US)

(72) Inventors: Ziyi Hu, Acton, MA (US); Robert F. Praino, Westwood, MA (US); David J. Arthur, Braintree, MA (US); John H. Ferguson, Attleboro, MA (US)

(73) Assignee: Chasm Advanced Materials, Inc., Canton, MA (US)

( * ) Notice: Subject to any disclaimer, the term of this patent is extended or adjusted under 35 U.S.C. 154(b) by 17 days.

(21) Appl. No.: 18/132,770

(22) Filed: Apr. 10, 2023

(65) Prior Publication Data

US 2023/0265307 A1   Aug. 24, 2023

Related U.S. Application Data

(63) Continuation of application No. PCT/US2021/054845, filed on Oct. 13, 2021.

(60) Provisional application No. 63/090,958, filed on Oct. 13, 2020.

(51) Int. Cl.
| | |
|---|---|
| C09D 11/52 | (2014.01) |
| C09D 11/037 | (2014.01) |
| C09D 11/101 | (2014.01) |
| C09D 11/104 | (2014.01) |
| C09D 11/107 | (2014.01) |
| H01B 5/14 | (2006.01) |

(52) U.S. Cl.
CPC ............ *C09D 11/52* (2013.01); *C09D 11/037* (2013.01); *C09D 11/101* (2013.01); *C09D 11/104* (2013.01); *C09D 11/107* (2013.01); *H01B 5/14* (2013.01)

(58) Field of Classification Search
CPC ... C09D 11/037; C09D 11/101; C09D 11/104; C09D 11/107; C09D 11/52; H01B 5/14
See application file for complete search history.

(56) References Cited

U.S. PATENT DOCUMENTS

| | | |
|---|---|---|
| 2010/0124611 A1 | 5/2010 | Mayo et al. |
| 2010/0140564 A1 | 6/2010 | Overbreek et al. |
| 2011/0104376 A1 | 5/2011 | Bielek et al. |
| 2013/0264390 A1 | 10/2013 | Frey et al. |
| 2014/0054515 A1 | 2/2014 | Lowenthal et al. |
| 2016/0185990 A1 | 6/2016 | Cho et al. |
| 2018/0037757 A1 | 2/2018 | Walters et al. |

FOREIGN PATENT DOCUMENTS

| | | |
|---|---|---|
| WO | 2020/092507 A2 | 5/2020 |
| WO | 2021/175989 A1 | 9/2021 |

OTHER PUBLICATIONS

International Search Report and Written Opinion of the International Searching Authority, mailed Feb. 1, 2022 in parent PCT/US2021/054845.

*Primary Examiner* — Mark Ruthkosky
*Assistant Examiner* — Sathavaram I Reddy
(74) *Attorney, Agent, or Firm* — Brian M. Dingman; Prince Lobel Tye LLP

(57) ABSTRACT

A curable carbon nanotube ink and a transparent conductive film made using the ink. The ink includes a curable resin binder, a catalyst that is configured to be activated and cure the resin binder, a viscous to vapor diluent, and carbon nanotubes (CNTs). The CNT concentration range in the ink is from about 0.001% to about 0.2% by weight.

13 Claims, 3 Drawing Sheets

CURABLE CARBON NANOTUBE INK AND TRANSPARENT CONDUCTIVE FILMS CREATED USING THE INK

CROSS-REFERENCE TO RELATED APPLICATION

This application is a continuation of International Application No. PCT/US2021/054845, filed Oct. 13, 2021 which claims Priority to Provisional Application 63/090,956 filed on Oct. 13, 2020, the entire disclosures of which are incorporated by reference herein for all purposes.

BACKGROUND

This disclosure relates to a curable conductive coating.
Carbon nanotube ink (i.e., conductive coating) can be used as part of a transparent conductive film (TCF).

SUMMARY

This invention includes a curable carbon nanotube (CNT) ink (i.e., a printable conductive coating), and transparent conductive films (TCFs) that are created (e.g., printed) using the ink. The ink contributes to both the conductivity of the film and its ability to stand up to environmental conditions. The ink also acts as an etching mask. The ink includes one or both of a radiation-curable and a thermally-curable resin that acts as a binder for the CNT when the resin is cured, and also promotes good adhesion, abrasion resistance, and chemical resistance. A catalyst facilitates curing of the resin. The ink also includes a viscous diluent that fully evaporates during the ink drying/curing process. The diluent helps to accomplish a desired viscosity of the ink that allows it to be coated onto an underlying substrate, such as by screen printing. In some examples the viscosity of the ink is from about 1,000 cP to about 50,000 cP. In some examples the curable carbon nanotube ink is composed of a single-wall carbon nanotube component and a UV and/or thermally curable polymer binder component. The CNT ink is a screen printable ink containing no surfactants. In general, CNTs require surfactants to remain as a dispersion, or else they may agglomerate. Once a coating with surfactants is printed or dried, the surfactants must be washed out. If they are not washed out, the electronic properties of a CNT layer are quite poor. In the present case the V2V diluent is sufficiently viscous (has a rheology) such that the CNT do not find each other/contact one another, and so do not agglomerate. The diluent then fully dries to develop the conductive coating from the ink, without the need to wash out any surfactants.

The present ink can be used in the creation of a TCF. The TCF includes a substrate, a metal nano-wire coating or a metal mesh (MM) layer on the substrate surface, and the ink over the nanowire or MM layer. After the ink is cured, the resulting multilayer structure demonstrates excellent electrical conductivity, high visible light transmission, and excellent adhesion of the metal nanowire (or metal mesh)/CNT composite structure to the substrate. In some examples the TCF also includes a substrate (polymer film, glass panel, etc.) without metal-nanowire or metal mesh coating, with the printed CNT ink.

This invention results in creation of novel curable carbon nanotube ink and printed film, which shows advantages of better adhesion to a metal-nanowire coating or a metal mesh layer, improved abrasion resistance, and better solvent and chemical resistance during the etching process as compared to TCFs prepared using non-curable CNT inks, while maintaining excellent electrical conductivity, high visible light transmission and low haze.

All examples and features mentioned below can be combined in any technically possible way.

In one aspect a curable carbon nanotube ink includes a curable resin binder, a catalyst that is configured to be activated and cure the resin binder, a viscous-to-vapor diluent, and carbon nanotubes (CNTs). The CNT concentration range in the ink is from about 0.001% to about 0.2% by weight.

Some examples include one of the above and/or below features, or any combination thereof. In an example the resin binder concentration range in the ink is from about 0.1% to about 5% by weight. In an example the catalyst concentration range in the ink is from about 0.001% to about 1.0% by weight. In an example the diluent concentration range in the ink is from about 90% to about 99% by weight. In an example the curable carbon nanotube ink further includes a filler resin with a concentration range in the ink of from about 0.1% to about 5% by weight. In an example the resin binder comprises a mixture of UV and thermal curable resins. In an example the curable carbon nanotube ink has a viscosity of from about 1,000 cP to about 50,000 cP. In an example the CNT comprises single-wall CNT.

Some examples include one of the above and/or below features, or any combination thereof. In an example the resin binder is radiation-curable. In an example the resin binder comprises one or more of a UV-curable multifunctional acrylic co-polymer, a UV-curable urethane polymer or a UV curable polyester. In an example the curable carbon nanotube ink further includes one or more of a non-UV curable resin, a multifunctional oligomer or a monomer. In an example the catalyst comprises a type I or type II free radical photo-initiator. In an example the resin binder is thermally curable. In an example the resin binder comprises one or more of an acrylic co-polymer with an acidic functional group, a urethane polymer or a polyester. In an example the catalyst comprises at least one of a polyaziridine crosslinker, a polycarbodiimide crosslinker or a peroxide type catalyst.

In another aspect, a transparent conductive film (TCF) includes a polymer film substrate, a metal nanowire layer or metal mesh layer on a surface of the film and a cured carbon nanotube (CNT) ink covering at least some of the metal nanowire layer or metal mesh layer. The CNT ink comprises a curable resin binder, a catalyst that is configured to be activated and cure the resin binder, a viscous to vapor diluent and CNTs. The CNT concentration range in the ink is from about 0.001% to about 0.2% by weight.

Some examples include one of the above and/or below features or any combination thereof. In an example the TCF demonstrates excellent electrical conductivity, high visible light transmission, and excellent adhesion of the metal nanowire layer or metal mesh layer and cured CNT ink to the substrate. In an example the TCF demonstrates better adhesion to the metal nano-wire layer or metal mesh layer, improved abrasion resistance and better solvent and chemical resistance during the etching process as compared to a TCF prepared using a non-curable CNT ink. In an example the TCF maintains excellent electrical conductivity, high visible light transmission and low haze.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the inventions. In the figures, identical or nearly identical components illustrated in various figures may be represented by a like reference character or numeral. For purposes of clarity, not every component may be labeled in every figure. In the figures.

DETAILED DESCRIPTION

Figure 1:
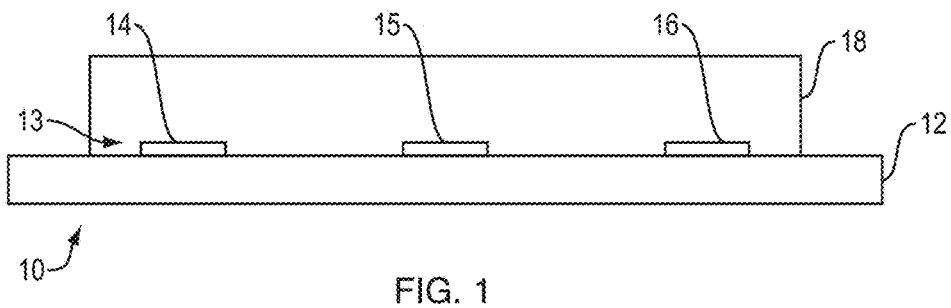
FIG. 1 is a schematic side view of a TCF.

Examples of the systems, methods and apparatuses discussed herein are not limited in application to the details of construction and the arrangement of components set forth in the following description or illustrated in the accompanying drawings. The systems, methods and apparatuses are capable of implementation in other examples and of being practiced or of being carried out in various ways. Examples of specific implementations are provided herein for illustrative purposes only and are not intended to be limiting. In particular, functions, components, elements and features discussed in connection with any one or more examples are not intended to be excluded from a similar role in any other examples.

Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure or characteristic described may be included in at least one example. The appearances of such terms herein are not necessarily all referring to the same example.

Also, the phraseology and terminology used herein is for the purpose of description and should not be regarded as limiting. Any references to examples, components, elements, acts or functions of the computer program products, systems and methods herein referred to in the singular may also embrace embodiments including a plurality, and any references in plural to any example, component, element, act or function herein may also embrace examples including only a singularity. Accordingly, references in the singular or plural form are not intended to limit the presently disclosed systems or methods, their components, acts or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

The CNT ink can be printed on flexible and rigid substrates. The substrates may be inorganic and/or organic, including but not limited to glass, silicon wafer, plastic films of polyethylene terephthalate (PET), polyethylene naphthalate (PEN), polycarbonate (PC), thermoplastic polyurethane (TPU), cyclic olefin polymer (COP), Silicone or polyimide (CPI). Plastic substrates could have a primer layer or have a surface treatment to improve surface tension (e.g., Corona Treatment, flame treatment, other plasma, etc.), and in some examples the film thickness is in the range of 12.5 microns to 300 microns.

The substrates, the nanowire layer (e.g., silver nanowire (AgNW) or the metal mesh (MINI) layer) and the fabrication methods of the TCF according to this disclosure can be of the types disclosed in International Patent Application Publication No. WO 2016/172315 and/or International Patent Application Publication No. WO 2020/102392, the entire disclosures of which are incorporated herein by reference for all purposes.

In some examples the TCF is fabricated in accordance with the following procedures.

Coating Solution Preparation:

Curable CNT Inks:

UV Curable CNT Ink:

A UV CNT ink formulation consists of a viscous-to-vapor ("V2V") diluent that fully evaporates during the ink drying/curing process, a CNT dispersion in alcohols and amines, a radiation-curable resin binder, a photo-initiator and optionally a non-UV-curable resin added to the UV resin mixture. In some examples the CNT concentrations are in the 0.01 to 2.0 g/L range (i.e., from about 0.001% to about 0.2% by weight in the ink). In some examples the range of CNT to UV resin or resin mixture binder concentration ratios (CNT/binder) is from about 1:1 to about 1:1200.

The V2V diluent helps to accomplish a desired viscosity of the ink that allows it to be coated onto an underlying substrate, such as by screen printing. In some examples the V2V diluent is of the types disclosed in U.S. Pat. Nos. 9,777,167, and 9,777,168, the entire disclosures of which are incorporated herein by reference for all purposes.

In some examples the UV resin binders include but are not limited to:

1. Multi-functional UV curable oligomers and monomers, such as Ebecryl 4859, Ebecryl 4858, Ebecryl 8701, Ebecryl 8605, Ebecryl 225, Ebecryl 4740, Ebecryl 4859, Ebecryl 8405, Ebecryl 1290, Ebecryl 4738, Ebecryl 4513, Ebecryl 284 from Allnex, SR 399, SR368, CN 9210, CN 9276, CN 9196, CN 9209, CN 2306 from Sartomer. Miramer M140, Miramer M150, Miramer M1182, Miramer M200, Miramer M 262, Miramer M 300, Miramer M 3130, Miramer M 420. Miramer PU 610, Miramer PU6510, Miramer PU5000, Miramer PU640, Miramer Sc2100, Miramer SC2152, Miramer MU 9500 from MIWON.

2. Multi-functional UV curable acrylic copolymers, Neo-Rad-A 20 from DSM, Ebecryl 4654 from Allnex, Lumicryl U-721S, Lumicryl102, Lumicryl2882 and Lumicryl 245 from Enstron.

In some examples the UV photo-initiators include, but are not limited to, Irgacure 651, Irgacure369, Irgacure901, Irgacure184, Irgacure 2959, Irgacure TPO, Irgacure 819 and Darocur 1173 from BASF, Omnirad 500, Esacure kip 160, Esacure kip 100F, Esacure kip 150, Esacure TZT, Esacure 3644, Esacure 1001M, Omnirad 4-PBZ, Omnirad BP from IGM.

In some examples the non-UV cured (i.e., non-curable) resin binders, when used, include but are not limited to Neocryl 819, Neocryl 817, Neocryl 890 and Neocryl 813 from DSM; Joncryl 857, Joncryl 586, Joncryl 611, Joncryl 678, Joncryl 680, Joncryl 682, Joncryl 683, Joncryl 693, JoncrylECO 675, Joncryl EC0684, Joncryl 817, Joncryl 819, Joncryl 820, Joncryl 821, Joncryl 901, Joncryl 903 Joncryl 843, Joncryl 848, Joncryl 67, Joncryl 690, Joncryl HPD 671 and Joncryl HPD 696 from BASF.

Thermally Curable CNT Ink:

A thermally curable CNT ink formulation consists of a V2V diluent, carbon nanotubes, a thermally-curable resin binder and a crosslinking agent or crosslinker.

In some examples the CNT concentrations and the CNT/binder ratios are as described above.

In some examples the cross-linkable resin binders include but are not limited to:

1. Acrylic copolymers with carboxyl function groups, including but not limited to Neocryl 818, Neocryl 819, Neocryl 890 from DSM. Joncryl 817, Joncryl 819, Joncryl 820, Joncryl 821, Joncryl 901, Joncryl 903, Joncryl 857, Joncryl 586, Joncryl 611, Joncryl 678, Joncryl 680, Joncryl 682, Joncryl 683, Joncryl 693, Joncryl ECO 675, Joncryl EC0684, Joncryl 843, Joncryl 848, Joncryl 67, Joncryl 690, Joncryl HPD 671 and Joncryl HPD 696 from BASF.
2. Crosslinkers include: (A) polycarbodiimide crosslinker including but not limited to Crosslinker CX-300 and Crosslinker XL-1 from DSM; Picassian® XL-702, XL-712, XL-752, XL-762 from STAHL, ZOLDINE® XL-29SE from ANGUS; (B) polyaziridine crosslinker including but not limited to Crosslinker CX-100 and NeoAdd™ PAX-521 from DSM, Picassian® XL-048 and Picassian® XL-706 from STAHL, PZ-28 and PZ-33 from PolyAziridine LLC.
3. The curing process is temperature and time dependent.

UV and Thermal (Dual Cure) CNT Ink:

A UV and thermal dual cure CNT ink formulation consists of a "V2V" diluent, CNT dispersion in alcohols and/or amines, a binder resin mixture of radiation curable acrylic copolymers and acrylic copolymers with carboxylic acid function groups, a photo-initiator and a crosslinker. UV curable acrylic copolymer, thermal curable acrylic copolymers with carboxy function groups, photo-initiator and thermal crosslinkers are defined above. The CNT concentrations and CNT/binder ratios are as described above.

Printing Process:

CNT Ink Printing Process:

Set up 355 polyester mesh screen with a 3 mm snap off distance.

Tape down the AgNW coated PET or polycarbonate substrate to a smooth surface.

Apply ~5 ml of the curable CNT ink above the pattern.

Flood the screen with CNT ink by drawing the fluid over the pattern using a squeegee.

Using ~75-degree squeegee angle, even (uniform) pressure and speed, shear the ink through the screen and onto the substrate.

Dry the coated sample in a convection oven set at 105° C. for 10 min with airflow.

Curing Processes:

For a radiation curing system, place coated sample (coating towards radiation source) under the radiation source, for example a UV lamp for a certain time period to achieve needed radiation dosage. The radiation cure set up can be a static one or a conveyor system. For example, a conveyor UV system equipped with mercury, LED or Xenon lamp and set conveyor belt speed to achieve UV curing dosage of 1400 mJ/cm^2, placed above UV CNT coated film on to the feeding end of the UV conveyor system and the UV curing process is completed after the coated film passes through the UV radiation zone and exits the conveyor system. The UV curing process can also be done without a conveyor system, as long as the dosage is in the range of from about 400 to about 1800 mJ/cm^2.

For the thermal cure process, in some examples the sample is cured at 110° C. for 60 seconds. (60-600 seconds is a preferred range).

After the initial sample drying from the printing process, for the combined UV and thermal cure process, curing can be accomplished by $1^{st}$ UV cure/$2^{nd}$ thermal cure, or $1^{st}$ thermal cure/$2^{nd}$ UV cure.

Pattern Etching Process:

The radiation cured samples were then sprayed with a 1-20% ferric nitrate ($Fe(NO_3)_3$) in water solution for 5-200 seconds. Using a separate wash bottle, the sample was then sprayed with deionized water on both sides of the film for 30 seconds. The film was then patted dry with lint-free cloths to remove large water droplets and then baked in a convection oven for 1 minute at 105° C. The etching can also be performed through an automated system consisting of etching, washing and drying, having a motorized film transport section.

Measurements:

Electrical properties of CNT ink printed film sheet resistance is measured with a R-check four-point sheet resistance meter (from EDTM).

Optical properties of total transmittance and transmission haze are measured with BYK Haze-Guard.

ASTM D3359 tape adhesion test is used to measure ink adhesion to plastic film substrates; any printed ink peel-off (less than 5B as defined in ASTM D3359) is considered a failure.

Abrasion test is performed by rubbing the printed ink surface with a cloth fabric, and any printed ink removal is considered a failure.

Ethanol resistance rubbing test is performed by wiping the printed ink surface with an ethanol soaked cloth; sheet resistance is then measured after 30 seconds drying time at ambient temperature. After 5 repetitive wiping passes, if the sheet resistance change is less than 10% of the original value, the sample is considered to pass the test.

A CNT-based hybrid TCF 10, FIG. 1, comprises a MINI layer 13 that includes metal traces 14-16, and an overlying CNT ink layer 18 that bonds to the top surface of substrate 12 and encapsulates MM layer 13 with a conductive medium. A circuit pattern results after any exposed MINI (i.e., the regions where the CNT ink is not printed) is removed via chemical etching. Note that the circuit pattern can alternatively or additionally be created from a metal nanowire layer rather than a metal mesh layer.

FIGS. 2A-2D illustrate results of a process for creating a TCF of the present disclosure. Note that the dimensions and other aspects of FIGS. 2A-2D are not to scale and may be exaggerated for the sake of illustration only. Actual examples are set forth below. Assembly 20, FIG. 2A, comprises substrate 22 that carries a MINI comprising traces 24-27. The MINI can be created on the substrate by various means as described herein. Also the MINI can comprise various conductive materials (e.g., metals), as further described herein. The MM comprises a series of thin traces (lines) that are electrically connected. The traces are typically but not necessarily laid out in a regular pattern.

Figure 2A:
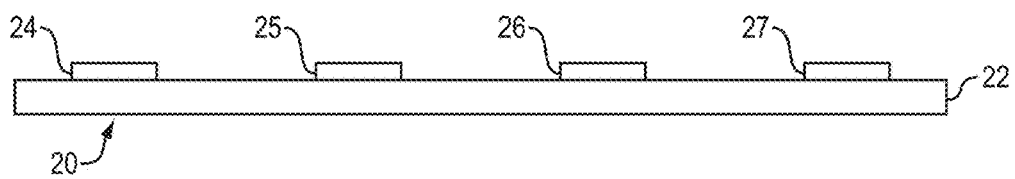
FIGS. 2A-2D illustrate a method of creating a TCF.
Figure 2B:
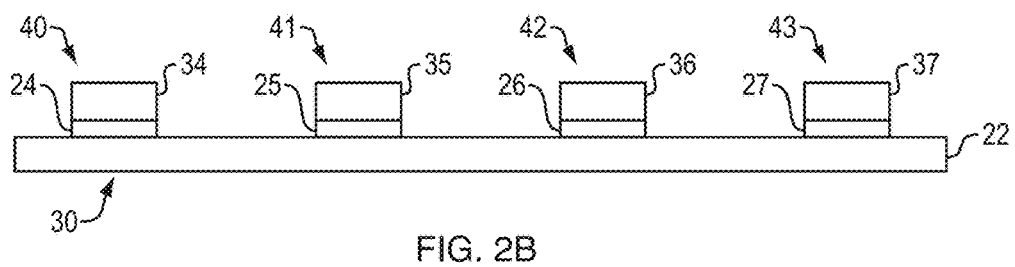

FIG. 2B illustrate a further assembly 30 wherein the MINI is over-plated with a second metal (in this non-limiting example the second metal being copper). Thus traces 24-27 are covered by a generally thicker layer of a second metal comprising portions 34-37, to create thickened and less-porous MM traces 40-43, respectively.

Figure 2C:
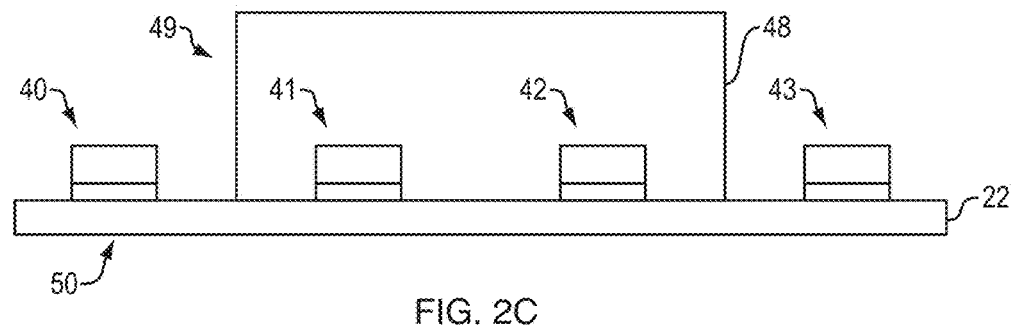

FIG. 2C illustrates a further assembly 50 wherein CNT ink 48 is printed or otherwise placed over some or all of the MM layer illustrated in FIG. 2B. In this illustration, ink 48 is printed over traces 41 and 42 but not over traces 40 and 43. Traces 40 and 43 are thus exposed while traces 41 and 42 are covered by a conductive medium that creates a conductive line or conductive area 49.

Figure 2D:
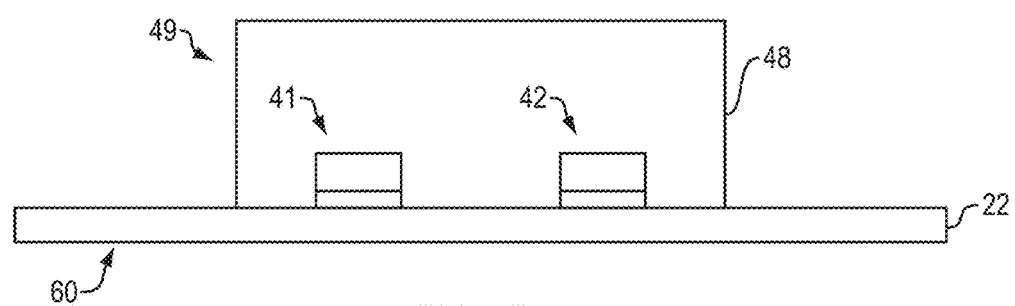

FIG. 2D illustrates the final TCF 60 wherein exposed traces 40 and 43 have been removed by etching, as explained in more detail elsewhere herein. This leaves conductor 49 on substrate 22.

Figure 3:
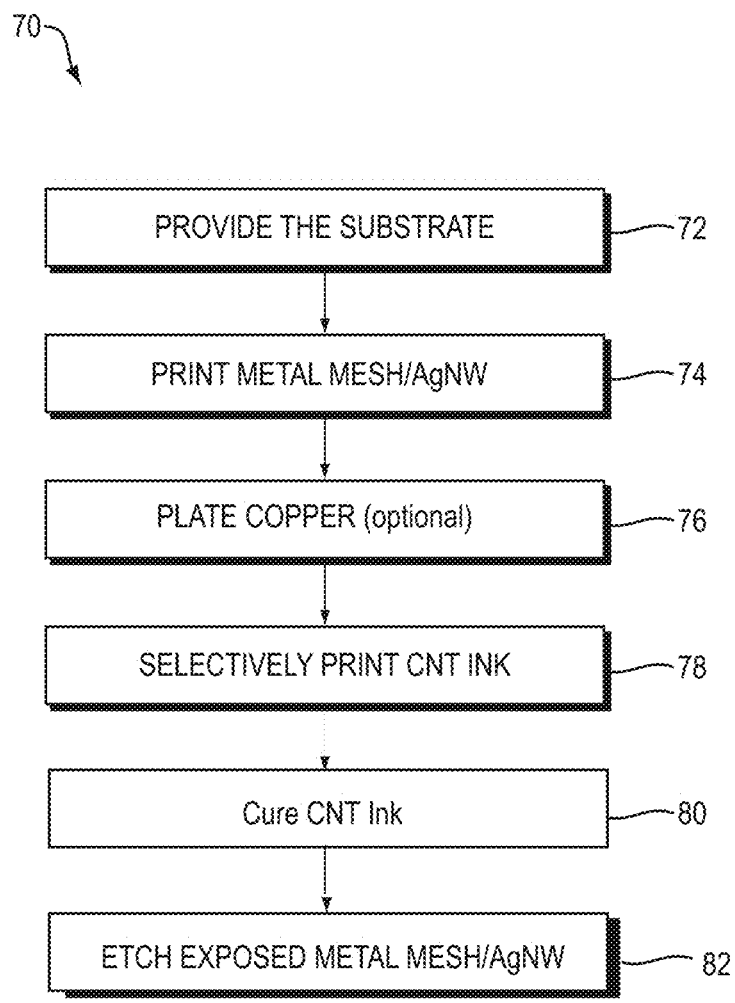
FIG. 3 illustrates the steps of a process for creating a TCF.

One exemplary method 70 for producing a TCF is illustrated in FIG. 3. In step 72 a suitable substrate is provided. In step 74 a metal mesh is printed on a surface of the substrate. In step 76 a second metal (e.g., copper) is plated on the metal mesh. Step 76 is optional, and if the MM itself has an acceptable Rs, the thickness (i.e., the height) of the MM lines may not need to be increased. The added plated metal increases the volume of the MM traces and so decreases its resistance. Also it may help to make the thin MM more robust and better able to bond with the conductive ink. In step 78 a curable conductive medium (termed an "ink") is printed in selected areas of the MM to form parts of a circuit. In an example the curable ink comprises carbon nanotubes as its conductive medium, and also contains a binder and other components as described herein. CNT inks are further described elsewhere herein. In step 80, the ink is cured in a manner appropriate for the particular ink and as further described elsewhere herein. The final step 82 contemplates etching exposed MM/copper, to leave behind on the substrate only the circuit.

Figure 4:
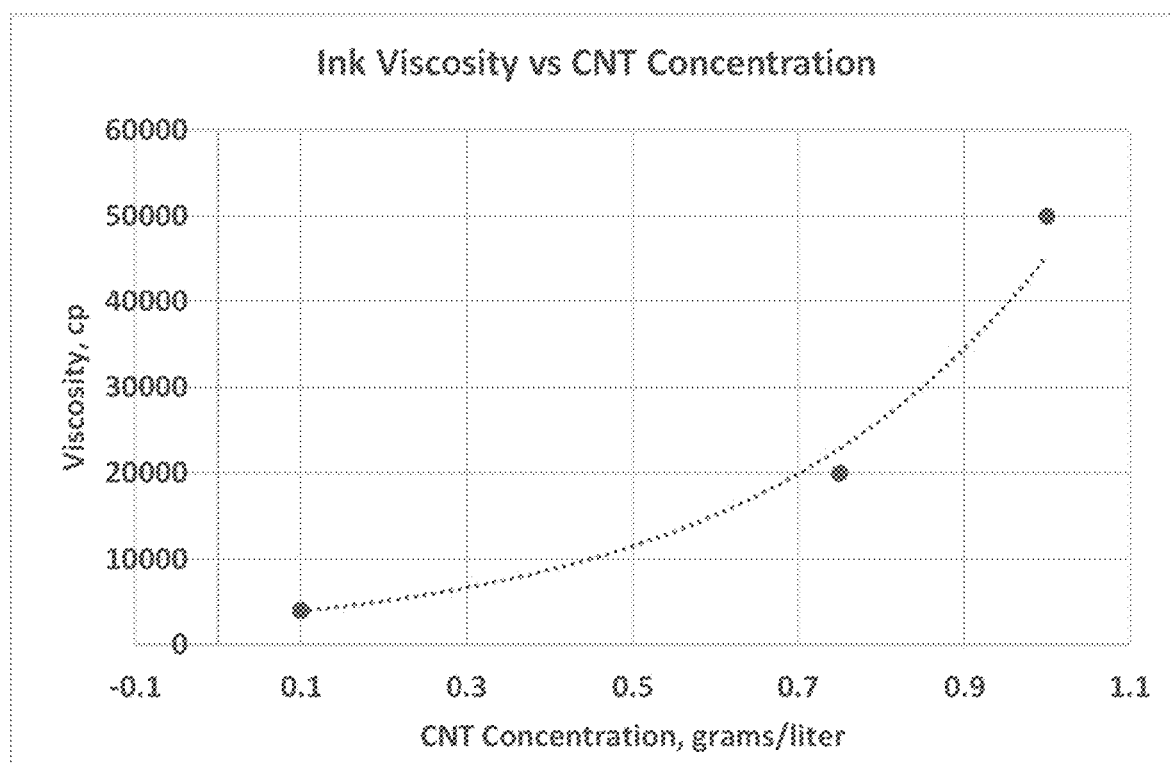
FIG. 4 is a graph illustrating ink viscosity for different levels of CNT.

FIG. 4 is a graph illustrating ink viscosity for different levels of CNT. The CNT concentration has a direct effect on the viscosity of the ink, as evidenced by the curve of FIG. 4. Generally, the inks herein should have viscosities in the range of from about 1,000 cp to about 50,000 cp in order for them to be screen printed using normal printing techniques, and be useful without the need for a surfactant as discussed above. In the present inks, 1 gram/liter of CNT equates to about 0.1%, which equates to a viscosity of about 50,000 cp. From the viscosity graph of FIG. 4 it is clear that including 3 grams/liter CNT would likely push the ink into a non-usable regime for printing, into the millions of cp. Even 0.2% CNT would extrapolate to about 700,000 cp.

Preferred Embodiment Results

Performance:

UV and/or thermally curable CNT ink creates the advantages of superior adhesion to substrates having a layer of metal-nanowire coating or metal mesh layer, superior abrasion resistance and chemical resistance during etching process over the same TCF designs but using non-cured resin binders, while maintaining equivalent electrical and optical properties of VLT and haze number.

Example 1

A UV-curable CNT ink with CNT concentration of 0.1 g/l and CNT/binder ratio of 1:120. The binder resin is composed of 60% wt of a UV curable polymer Lumicryl 245 from Enstron and 40% wt of Neocryl B-890 a non-UV curing polymer from DSM. A photo-initiator Esacure KIP 100F is used, with photo-initiator-to-binder ratio of 1:50. A non-UV cure CNT ink (identified as VC200) was tested for comparison (as a control baseline). VC200 has the same CNT, polymer binder and diluent concentrations as the UV CNT ink, but the resin binder is a non-curable thermal plastic polymer, for example 100% NeoCryl® B-890.

The UV CNT ink and VC200 were screen printed on a C3 Nano AgNW coated PET film (125 um thick) with a sheet resistance of $30+/-2\Omega/\square$. The screen mesh size is 305, and the drying condition is described above. The UV CNT ink printed sample was then UV cured with UV dosage of 1400 mj/cm^2. The UV cured sample and the coated VC200 samples were subsequently etched with 10% ferric nitrate $(Fe(NO_3)_3)$ in water solution for 12 seconds, then washed with deionized water and oven dried as described above. Performance tests were followed on the dry etched samples and the test results are listed in Table 1. The test was repeated on C3 Nano AgNW PET film of sheet resistances of $10\Omega/\square$, and $75\ \Omega/\square$.

The test data listed in Tables 1A, 1B, and 1C clearly demonstrates that the UV cured CNT ink shows superior performance in adhesion to AgNW film substrates and superior abrasion and solvent resistance as compared to VC200 control using non-curable CNT ink.

TABLE 1A

VC200 and UV CNT ink printed on C3 Nano 30 $\Omega/\square$ PET film

|  | VC200 non-curable CNT ink | UV CNT ink |
|---|---|---|
| Sheet resistance ($\Omega/\square$) | 32 | 30 |
| Tape adhesion ASTM 3359 | Fail | Pass |
| abrasion test with fabric abrading | Fail | Pass |
| Solvent resistance rub test with ethanol | Fail | Pass |
| CNT ink print pattern loss in etching process | None | None |
| Total VLT (substrate plus coating) | 89 | 88 |
| Haze number | 2.2 | 2.3 |

TABLE 1B

VC200 and UV CNT ink printed on C3 Nano 10 $\Omega/\square$ PC film

|  | VC200 non-curable CNT ink | UV CNT ink |
|---|---|---|
| Sheet resistance ($\Omega/\square$) | 12 | 10 |
| Tape adhesion ASTM 3359 | Pass | Pass |
| Abrasion test with fabric abrading | Fail | Pass |
| Solvent resistance rub test with ethanol | Fail | Pass |
| CNT ink print pattern loss in etching process | None | None |
| Total VLT | 84.5 | 84.2 |
| Haze number | 3.88 | 3.67 |

TABLE 1C

VC200 and UV CNT ink printed on C3 Nano 75 $\Omega/\square$ PET film

|  | VC 200 non-curable CNT ink | UV CNT ink |
|---|---|---|
| Sheet resistance ($\Omega/\square$) | 85 | 76 |
| Tape adhesion ASTM 3359 | Pass | Pass |
| Abrasion test with fabric abrading | Fail | Pass |
| Solvent resistance rub test with ethanol | Fail | Pass |

TABLE 1C-continued

VC200 and UV CNT ink printed on C3 Nano 75 Ω/□ PET film

|  | VC 200 non-curable CNT ink | UV CNT ink |
|---|---|---|
| CNT ink print pattern loss in etching process | Slight | None |
| Total VLT | 89.5 | 89.8 |
| Haze number | 1.5 | 1.5 |

Example 2

A thermally curable CNT ink with CNT concentration of 0.1 g/l and CNT/binder ratio of 1:120. The binder resin is composed of a carboxylic acid functional acrylic resin Joncryl HPD 671 from BASF and a curing agent CX-100 from DSM with crosslinker to polymer ratio of 1:12. A non-curable CNT ink VC200 was tested for comparison. VC200 has CNT concentration of 0.1 g/l and CNT/polymer binder ratio of 1:120, the same as the thermally curable CNT ink.

The thermally curable CNT ink and VC200 were screen printed (screen size 305) on a C3 Nano AgNW coated PET film (125 um in thickness) with sheet resistance of 75+/−2Ω/□. The printed film samples were dried with a conveyor belt oven set at 110 C and drying time of 180 seconds. The thermal cured sample can be cured at ambient temperature for 120 hours, or acceleratedly cured at 110° C. for 600 seconds. The VC200 printed and thermal cured samples were subsequently etched with 10% ferric nitrate ($Fe(NO_3)_3$) in water solution for 12 seconds, then washed with deionized water and dried in an oven at 110° C. for 60 seconds. Performance tests were followed and the test results were listed in Table 2. The curable ink shows superior performance in abrasion and solvent wiping and etching resistance.

TABLE 2

VC200 and UV CNT ink printed on C3 Nano 75 Ω/□ PET film

|  | VC 200 non curable CNT ink | Thermally curable CNT ink |
|---|---|---|
| Sheet resistance (Ω/□) | 85 | 74 |
| Tape adhesion ASTM 3359 | Pass | Pass |
| abrasion test with fabric abrading | Fail | Pass |
| Solvent resistance rub test with ethanol | Fail | Pass |
| CNT ink print pattern loss in etching process | Slight | None |
| VLT | 89.5 | 89.6 |
| Haze number | 1.5 | 1.4 |

Example 3

A dual-cured CNT ink with CNT concentration of 0.1 g/l and CNT/binder ratio of 1:120. The binder resin is composed of 30% wt of a UV curable polymer Lumicryl 245 from Enstron, a 70 wt % carboxylic acid functional acrylic resin Joncryl HPD 671 from BASF, a type II photo-initiator Omnirad 4PBZ and a co-initiator Esacure A198 both from IGM and a thermal curing agent CX-100 from DSM. A non-curable CNT ink VC200 was tested for comparison. VC200 has CNT concentration of 0.1 g/l and CNT/polymer binder ratio of 1:120, the same as dual cure CNT ink.

The dual curable CNT ink and VC200 were screen printed (screen size 305) on a C3 Nano AgNW coated PET film (125 um in thickness) with sheet resistance of 75+/−2Ω/□. The printed film samples were dried with a conveyor belt oven set at 110 C and drying time of 180 seconds. The samples were subsequently UV cured with UV dosage of 1400 mj/cm^2, followed by thermal curing at 110° C. for 600 seconds. The cured samples were then etched with 10% ferric nitrate ($Fe(NO_3)_3$) in water solution for 12 seconds. Performance tests were followed and the test results were listed in Table 3. The dual cure ink shows superior performance in etching resistance over UV cure only and thermal cure only CNT ink.

TABLE 3

VC200, UV/thermal dual cure, UV cure, and thermal cure CNT ink printed on C3 Nano 75 Ω/□ PET film

|  | VC 200 non curable CNT ink | UV/thermal dual cure CNT ink | UV curable CNT ink | Thermally curable CNT ink |
|---|---|---|---|---|
| Sheet resistance (Ω/□) (After etching) | 85 | 62 | 76 | 74 |
| Tape adhesion ASTM 3359 | Pass | Pass | Pass | Pass |
| abrasion test with fabric abrading | Fail | Pass | Pass | Pass |
| Solvent resistance rub test with ethanol | Fail | Pass | Pass | Pass |
| CNT ink print pattern loss in etching process | Slight | None | None | None |
| VLT | 89.5 | 89.1 | 89.8 | 89.6 |
| Haze number | 1.5 | 1.6 | 1.5 | 1.6 |

Having described above several aspects of at least one example, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A curable electrically conductive screen printable carbon nanotube ink that is configured to be screen printed on a substrate, and then cured to coat the substrate, comprising:
    a curable resin binder;
    a catalyst that is configured to be activated and cure the curable resin binder;
    an evaporative amine-acid adduct viscous to vapor diluent that increases the viscosity of the ink and is configured to fully evaporate during curing of the curable carbon nanotube ink that occurs after the ink has been applied to the substrate; and
    carbon nanotubes (CNTs);
    wherein the CNT concentration range in the curable carbon nanotube ink is from about 0.001% to about 0.1% by weight, wherein the concentration range of the evaporative amine-acid adduct viscous to vapor diluent in the curable nanotube ink is from about 90% to about 99% by weight, wherein a weight ratio of carbon nanotubes to curable resin binder in the curable carbon nanotube ink is from 1:120 to 1:1,200, and wherein the curable carbon nanotube ink has a viscosity of from about 1,000 cP to about 50,000 cP that is sufficient to allow the ink to be screen printed on the substrate.

2. The curable electrically conductive screen printable carbon nanotube ink of claim 1, wherein the curable resin binder has a concentration range in the curable carbon nanotube ink of from about 0.1% to about 5% by weight.

3. The curable electrically conductive screen printable carbon nanotube ink of claim 1, wherein the catalyst has a concentration range in the curable carbon nanotube ink of from about 0.001% to about 1.0% by weight.

4. The curable electrically conductive screen printable carbon nanotube ink of claim 1, further comprising a filler resin with a concentration range in the curable carbon nanotube ink of from about 0.1% to about 5% by weight.

5. The curable electrically conductive screen printable carbon nanotube ink of claim 1, wherein the curable resin binder is radiation-curable.

6. The curable electrically conductive screen printable carbon nanotube ink of claim 5, wherein the curable resin binder comprises one or more of a UV-curable multifunctional acrylic co-polymer, a UV-curable urethane polymer, or a UV curable polyester.

7. The curable electrically conductive screen printable carbon nanotube ink of claim 6, further comprising one or more of a non-UV curable resin, a multifunctional oligomer, or a monomer.

8. The curable electrically conductive screen printable carbon nanotube ink of claim 5, wherein the catalyst comprises a type I or type II free radical photoinitiator.

9. The curable electrically conductive screen printable carbon nanotube ink of claim 1, wherein the curable resin binder is thermally curable.

10. The curable electrically conductive screen printable carbon nanotube ink of claim 9, wherein the curable resin binder comprises one or more of an acrylic co-polymer with an acidic functional group, a urethane polymer, or a polyester.

11. The curable electrically conductive screen printable carbon nanotube ink of claim 9, wherein the catalyst comprises at least one of a polyaziridine crosslinker, a polycarbodiimide crosslinker, or a peroxide type catalyst.

12. The curable electrically conductive screen printable carbon nanotube ink of claim 1, wherein the curable resin binder comprises a mixture of UV and thermal curable resins.

13. The curable electrically conductive screen printable carbon nanotube ink of claim 1, wherein the CNT comprises single-wall CNT.

* * * * *